United States Patent
Sadowara (10) Patent No.: US 12,050,824 B2
(45) Date of Patent: Jul. 30, 2024

(54) IMAGE FORMING DEVICE AND IMAGE FORMING METHOD

(71) Applicant: Toshiba Tec Kabushiki Kaisha, Tokyo (JP)

(72) Inventor: Tetsuya Sadowara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/461,925

(22) Filed: Sep. 6, 2023

(65) Prior Publication Data

US 2023/0409258 A1 Dec. 21, 2023

Related U.S. Application Data (63) Continuation of application No. 17/830,630, filed on Jun. 2, 2022, now abandoned.

Foreign Application Priority Data

Nov. 10, 2021 (JP) ................................. 2021-183454

(51) Int. Cl.
  *G06F 3/12* (2006.01)
(52) U.S. Cl.
  CPC .......... *G06F 3/1242* (2013.01); *G06F 3/1206* (2013.01); *G06F 3/1238* (2013.01)
(58) Field of Classification Search
  CPC .... G06F 3/1242; G06F 3/1238; G06F 3/1206; G03G 15/502; G03G 15/36; H04N 1/00938; H04N 1/00657
  See application file for complete search history.

(56) References Cited

U.S. PATENT DOCUMENTS

2002/0138557 A1 9/2002 Mukaiyama et al.
2002/0161830 A1 10/2002 Mukaiyama et al.
(Continued)

FOREIGN PATENT DOCUMENTS

JP 2002-373161 A 12/2002
JP 2009-182914 A 8/2009

OTHER PUBLICATIONS

Extended European Search Report dated Apr. 11, 2023 issued in corresponding European Patent Application No. 22189152.6, 8 pages.
(Continued)

*Primary Examiner* — John R Wallace
(74) *Attorney, Agent, or Firm* — FOLEY & LARDNER LLP (57) ABSTRACT

According to one embodiment, there is provided an image forming device, the image forming device applying information differently for each copy to a sheet on which an image is to be formed. The image forming device includes a controller, an image forming processor, and an authenticator. The controller is configured to acquire image information, the image information including an input image to be formed on a sheet and applying information associated with each copy, in response to the input image being formed. The controller is configured to generate a composite image obtained by applying an applying image based on the applying information for each copy to the input image. The image forming processor is configured to form the composite image generated for each copy on the sheet of each copy. The authenticator is configured to authenticate a user based on a user identity.

17 Claims, 7 Drawing Sheets

(56) References Cited

U.S. PATENT DOCUMENTS

| | | |
|---|---|---|
| 2002/0161831 A1 | 10/2002 | Nakaoka et al. |
| 2002/0186408 A1 | 12/2002 | Nakaoka et al. |
| 2005/0111867 A1 | 5/2005 | Hatano |
| 2006/0221372 A1* | 10/2006 | Onishi ................. G06F 3/1296 358/1.13 |
| 2006/0277219 A1 | 12/2006 | Sato |
| 2009/0073508 A1 | 3/2009 | Sadowara |
| 2012/0082337 A1 | 4/2012 | Ohira |
| 2012/0250086 A1 | 10/2012 | Imayoshi |
| 2015/0062650 A1* | 3/2015 | Miyahara ........... H04N 1/32144 358/1.18 |
| 2015/0109634 A1 | 4/2015 | Takahata et al. |
| 2016/0156804 A1* | 6/2016 | Suzuki ............... H04N 1/00498 358/1.11 |

OTHER PUBLICATIONS

Final Office Action on U.S. Appl. No. 17/830,630 DTD Jun. 7, 2023.
Non-Final Office Action on U.S. Appl. No. 17/830,630 DTD Feb. 16, 2023.

* cited by examiner

IMAGE FORMING DEVICE AND IMAGE FORMING METHOD

CROSS-REFERENCE TO RELATED APPLICATIONS

This application is a continuation of U.S. patent application Ser. No. 17/830,630, filed on Jun. 2, 2022, which is based upon and claims the benefit of priority from Japanese Patent Application No. 2021-183454, filed on Nov. 10, 2021, the entire contents of each of which are incorporated herein by reference.

FIELD

Embodiments described herein relate generally to an image forming device and an image forming method.

BACKGROUND

Typically, image forming devices can apply information specified by a user to a sheet such as paper at the time of copying and printing. For example, there are image forming devices that can apply a stamp to a sheet by a stamp function. Examples of the image forming devices include devices such as copiers, printers, or multifunction peripherals (MFP).

DETAILED DESCRIPTION

In the typical image forming devices, when plural copies of images of a manuscript are formed, only the same information can be applied to all copies.

One embodiment described herein provides an image forming device and an image forming method that can apply information different for each copy to a sheet on which an image is to be formed.

According to one embodiment, an image forming device includes a control unit or controller and an image forming unit or image forming processor. The control unit is configured to acquire image information showing an input image to be formed on a sheet and applying information associated with each copy when the input image is formed, and generate a composite image obtained by applying an applying image based on the applying information for each copy to the input image. The image forming unit is configured to form the composite image generated for each copy on the sheet for each copy.

Hereinafter, an image forming device and an image forming method according to one embodiment will be described with reference to the drawings.

Figure 1:
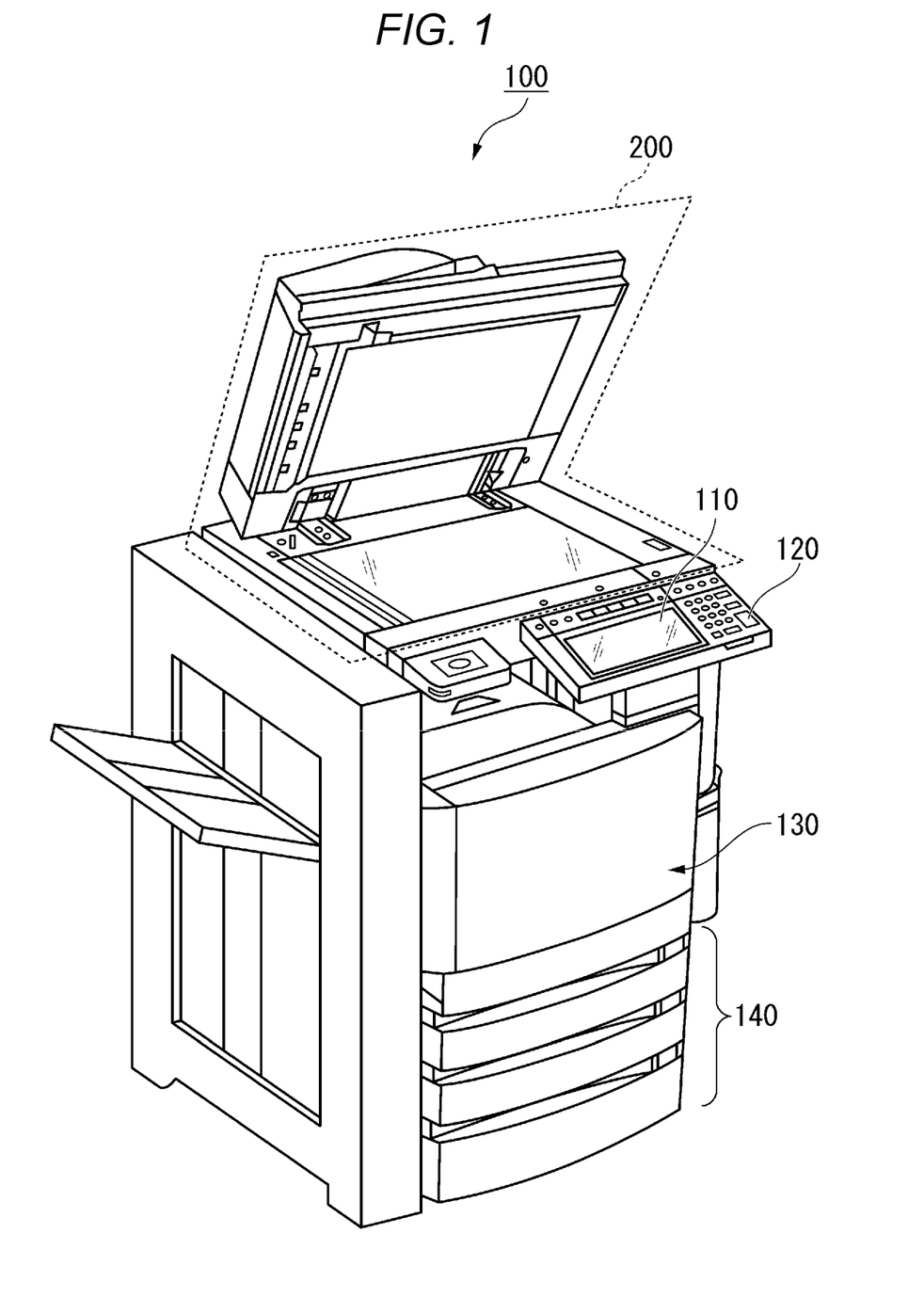
FIG. 1 is an external view showing an overall configuration of an image forming device of one embodiment.

An overall configuration of an image forming device 100 of the embodiment will be described. FIG. 1 is an external view showing an overall configuration example of the image forming device 100. The image forming device 100 of the embodiment is an MFP. The image forming device 100 includes a display 110, a control panel 120, a printer unit or printer 130, a sheet accommodating unit or sheet feeder 140, and an image reading unit or image reader 200. The image forming device 100 may be, for example, a copier or a printer instead of the MFP.

The display 110 (display unit) is a display device such as a liquid crystal display (LCD) or an organic electro luminescence (organic EL) display. The display 110 displays various pieces of information about the image forming device 100 under the control of the control unit or controller 101 described later. The display 110 may be an input and output device such as a touch panel integrated with the control panel 120 described below.

The control panel 120 is an input device that receives an input operation of a user. The control panel 120 includes, for example, a plurality of input buttons. When the control panel 120 is, for example, a touch panel integrated with the display 110, the input buttons may be an image displayed on the display 110. The control panel 120 outputs an operation signal corresponding to the input operation of the user to the control unit or controller 101.

The printer unit 130 forms an image on a sheet based on an input image data file including image data generated by the image reading unit 200. The printer unit 130 is one example of an image forming unit. The printer unit 130 may be a device that fixes a visible image such as a toner image on the sheet to form the image, or a device that forms the image by an inkjet method. The sheet is, for example, paper or label paper. Nevertheless, the sheet may be any material as long as the image forming device 100 can form the image on the surface of the sheet. The sheet may be a sheet accommodated in the sheet accommodating unit 140, or may be a sheet manually inserted into the image forming device 100.

The sheet accommodating unit 140 accommodates the sheet used for forming the image by the printer unit 130.

The image reading unit 200 reads the image formed on a manuscript placed on a manuscript table based on the brightness and darkness of light, and generates the image data that is digital data. The image reading unit 200 outputs the generated image data to the control unit or controller 101. The control unit or controller 101 stores the input image data file including the input image data in the auxiliary storage device or auxiliary storage 103 described later. The control unit 101 may output the input image data file to an external storage device or storage medium via, for example, a network. The control unit 101 may output the input image data file to the printer unit 130 without storing the input image data file in the storage device or the like.

Figure 2:
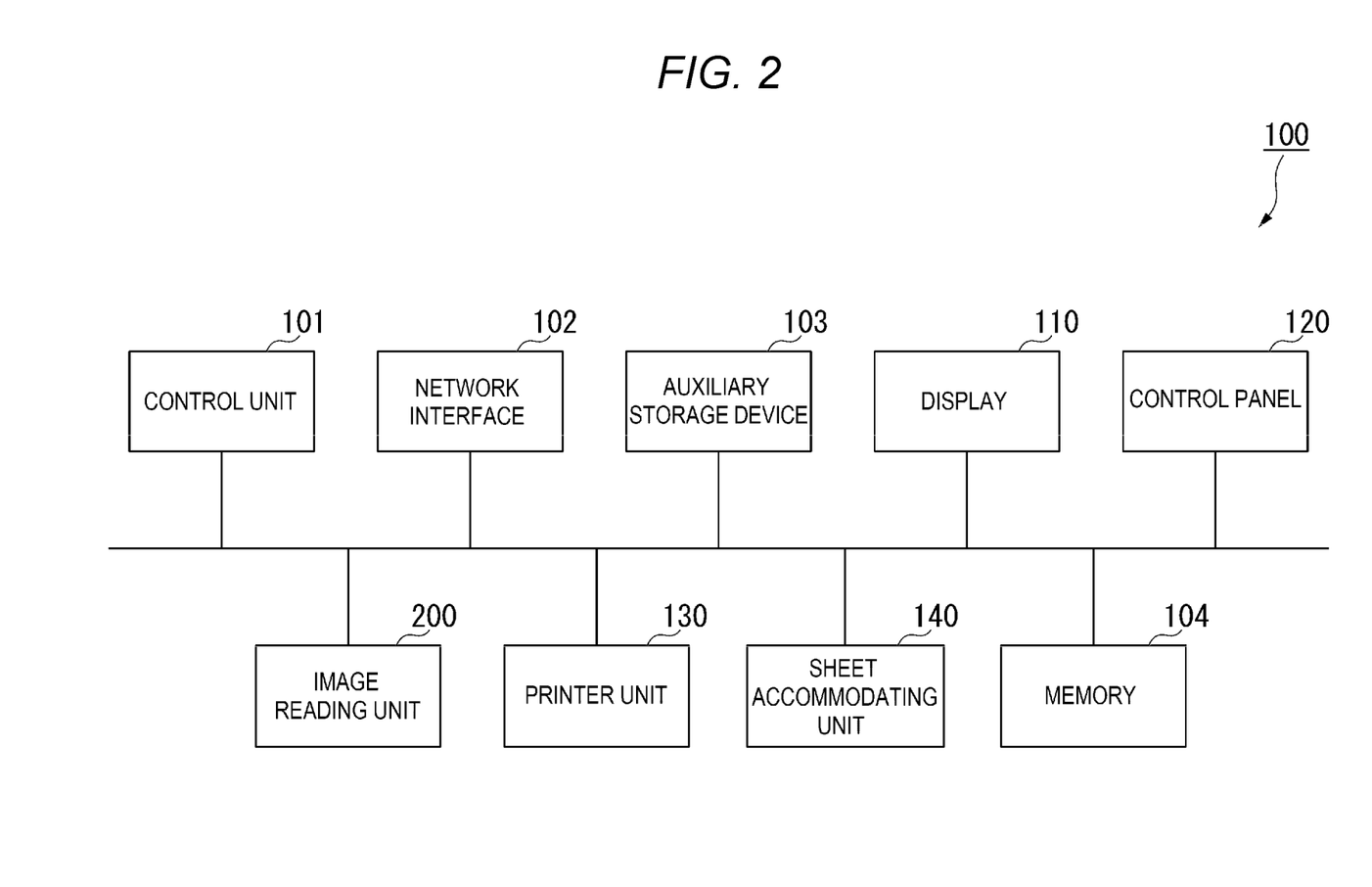
FIG. 2 is a block diagram showing a hardware configuration.

Thereafter, the hardware configuration of the image forming device 100 of the embodiment will be described with reference to FIG. 2. FIG. 2 is a block diagram showing the hardware configuration of the image forming device 100.

The image forming device 100 includes the control unit or controller 101, a network interface 102, the auxiliary storage device 103, a memory or memory circuitry 104, the display 110, the control panel 120, the printer unit or printer 130, the sheet accommodating unit or sheet feeder 140, and the image reading unit or image reader 200. These components included in the image forming device 100 are connected by an internal bus so that data can be exchanged. The functional units described with reference to FIG. 1 are designated by the same reference numerals as those in FIG. 1, and the description thereof will be omitted.

The control unit 101 controls acts of each component of the image forming device 100. The control unit 101 controls the components to execute various processes by executing a program. The program is stored in advance in, for example, the memory 104 or the auxiliary storage device 103. The functional configuration of the control unit 101 will be described in detail later.

The network interface 102 transmits and receives data to and from an external device. The network interface 102 acts as an input interface and receives the data transmitted from the external device. The network interface 102 acts as an output interface and transmits data to the external device.

The auxiliary storage device 103 is a storage medium such as a hard disk drive (HDD) or a solid state drive (SSD). The auxiliary storage device 103 stores various kinds of data. The various kinds of data include, for example, image data, image data files, and various setting data. The configuration of information recorded in the auxiliary storage device 103 will be described in detail later.

The memory 104 is a storage medium such as a random access memory (RAM). The memory 104 temporarily stores data and programs used by the components included in the image forming device 100. In addition, the digital data such as the image data generated by the image reading unit 200 may be recorded in the memory 104 instead of the auxiliary storage device 103.

Figure 3:
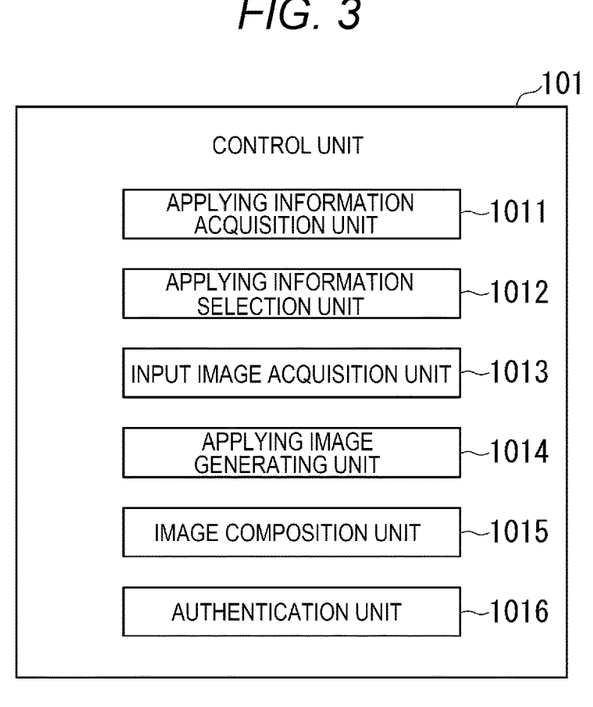
FIG. 3 is a block diagram showing a schematic configuration of a control unit.
Figure 4:
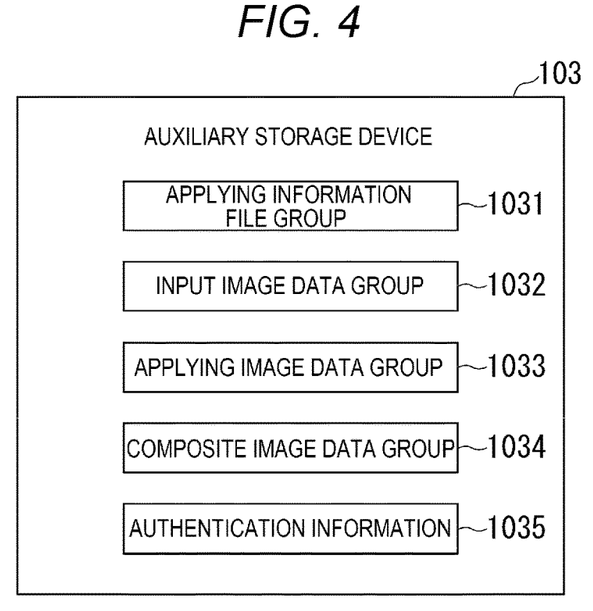
FIG. 4 is a block diagram showing a schematic configuration of an auxiliary storage device.

Hereinafter, the configuration of the control unit 101 and the configuration of the auxiliary storage device 103 of the image forming device 100 of the embodiment will be described. FIG. 3 is a block diagram showing the configuration of the control unit or controller 101. The control unit 101 includes an applying information acquisition unit or applying information receiver 1011, an applying information selection unit or applying information selector 1012, an input image acquisition unit or input image receiver 1013, an applying image generating unit or applying image generator 1014, an image composition unit or image aggregator 1015, and an authentication unit or authenticator 1016. FIG. 4 is a block diagram showing the configuration of the auxiliary storage device 103. The auxiliary storage device 103 stores an applying information file group 1031, an input image data group 1032, an applying image data group 1033, a composite image data group 1034, and authentication information 1035.

The applying information acquisition unit 1011 acquires an applying information file from the external device. The applying information file is a file showing a list of information (hereinafter referred to as "applying information") to be applied to the sheet for each copy at the time of copying or printing. The applying information file is, for example, text data in comma-separated values (CSV) format or tab-separated values (TSV) format. The applying information acquisition unit 1011 stores the acquired applying information file in the auxiliary storage device 103.

Figure 5:
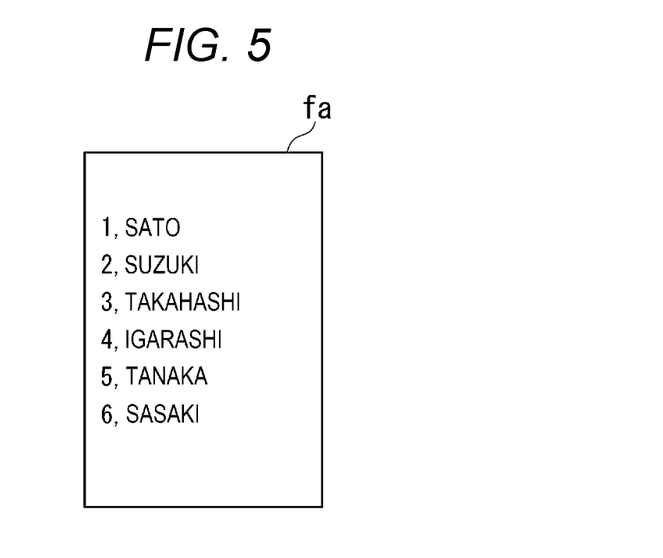
FIG. 5 is a diagram showing one example of an applying information file.

FIG. 5 is a diagram showing one example of the applying information file. As shown in FIG. 5, an applying information file fa is text data in CSV format. In the applying information file fa, names of persons may be associated with numbers from "1" to "6". Each of the numbers from "1" to "6" in the applying information file fa may be associated with a copy at the time of copying or printing. Each of the six types of names in the applying information file fa is the applying information. That is, when the applying information file fa is specified at the time of copying or printing, for example, an image representing characters "TANAKA" is applied to an image to be formed on a sheet of a first copy. Alternatively, for example, an image representing characters "SUZUKI" is applied to an image to be formed on a sheet of a second copy. Hereinafter, an image showing the applying information is referred to as the "applying image".

The applying information file is created, for example, on a PC of the user. The user creates the applying information file, and transmits the created applying information file from the PC to the image forming device 100 via a communication network. The applying information acquisition unit 1011 acquires the applying information file transmitted from the PC of the user via the network interface 102. The configuration in which the applying information acquisition unit 1011 acquires the applying information file is not limited to such a configuration. For example, the applying information acquisition unit 1011 may acquire the applying information file created by inputting information by the user using the control panel 120.

The applying information selection unit 1012 acquires information showing a selection result as to whether to apply an applying image to an input image at the time of copying or printing. The applying information selection unit 1012 acquires information showing a selection result as to the type of the applying image to be applied to the input image. The applying information selection unit 1012 acquires information showing a selection result as to whether the same applying image is applied to all pages or an applying image different for each copy is applied. When an applying image different for each copy is applied, the applying information selection unit 1012 acquires information showing the applying information file selected from the applying information file group 1031.

For example, the applying information selection unit 1012 generates an image (hereinafter, referred to as "selection screen") for the user to make the above selection, and displays the image on the display 110. The user refers to the selection screen displayed on the display 110 and performs an input operation for making the above selection using the control panel 120. The applying information selection unit 1012 acquires information showing the content of the input operation performed by the user from the control panel 120. As a result, the applying information selection unit 1012 can acquire information showing various selection results based on the input operation from the user.

Figure 6:
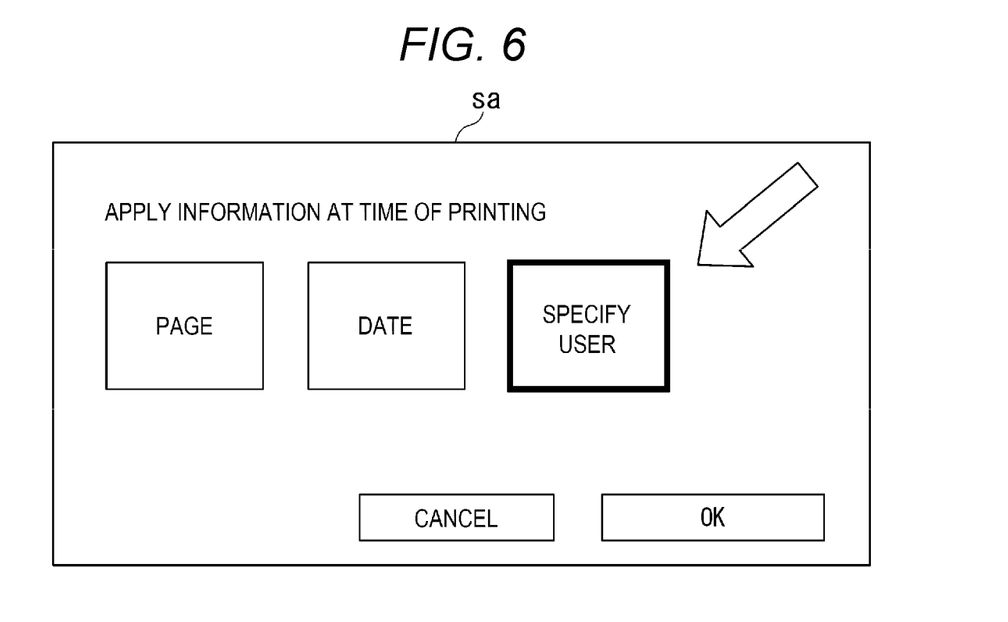
FIG. 6 is a diagram showing a first example of a selection screen displayed on a display.
Figure 7:
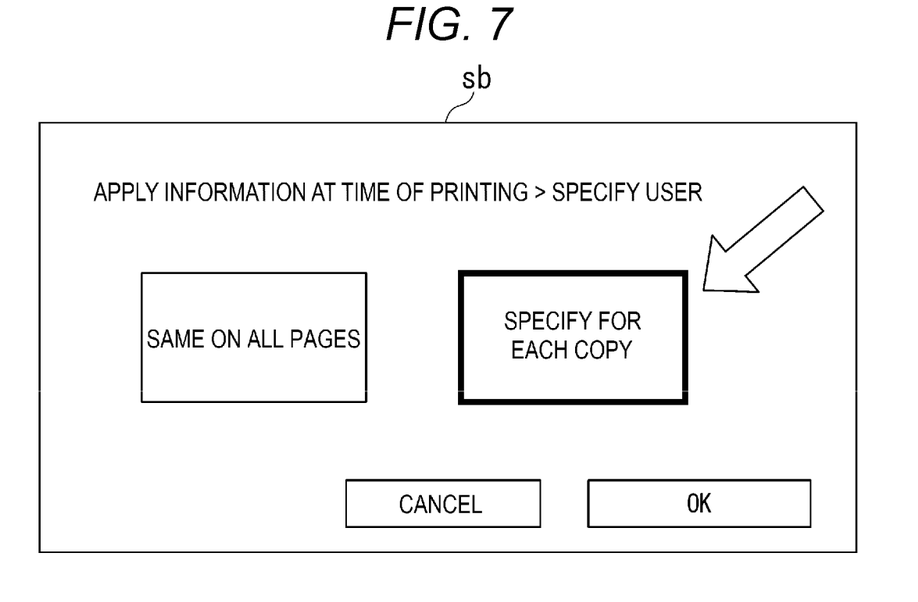
FIG. 7 is a diagram showing a second example.
Figure 8:
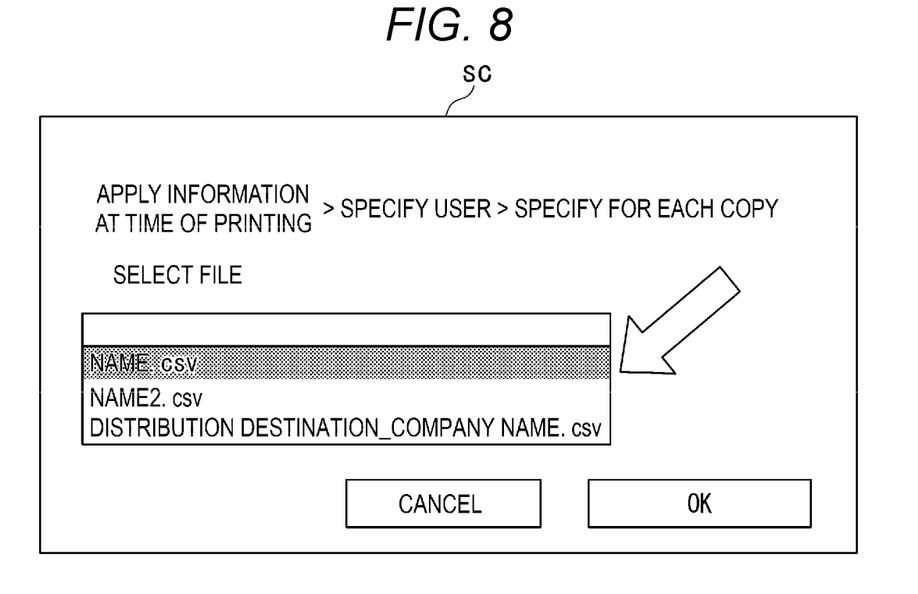
FIG. 8 is a diagram showing a third example.

FIGS. 6 to 8 are diagrams showing examples of the selection screen. A selection screen sa (second selection screen) shown in FIG. 6 is a selection screen for the user to select whether to apply an applying image to the input image. The selection screen sa is also a selection screen for the user to select the type of the applying image to be applied to the input image. On the selection screen sa, the user can select three types of applying images including an applying image showing the number of pages, an applying image showing the date, and an applying image specified by the user. On the selection screen sa, the user can select one or more applying images among these three types of applying images, and may not select any of the images. For example, when all the three types of applying images are selected, all the three types of applying images are applied to the image to be formed on each sheet at the time of copying or printing.

For example, as shown in FIG. 6, the applying information selection unit 1012 controls the selection screen sa such that a button image showing the selected type of the applying image is surrounded by a thick frame. As a result, the user can confirm which type of the applying image is in a selected state on the selection screen sa. For example, FIG. 6 shows a selection screen sa in a state where only the applying image specified by the user is selected. When the user wants to apply an applying image different for each copy to the sheet at the time of copying or printing, the user may select the applying image specified by the user.

A selection screen sb shown in FIG. 7 is one example of a transitioning selection screen when the applying image specified by the user is selected on the selection screen sa shown in FIG. 6. The selection screen sb (third selection screen) is a selection screen for the user to select whether to apply the same applying image to all pages or to apply an applying image different for each copy. For example, FIG. 7 shows the selection screen sb in a state in which a selection is made to apply an applying image different for each copy.

A selection screen sc shown in FIG. 8 is one example of a transitioning screen when the selection is made to apply an applying image different for each copy on the selection screen sb shown in FIG. 7. The selection screen sc (first selection screen) is a selection screen for the user to select the applying information file to be used at the time of copying or printing. For example, in FIG. 8, "name.csv", "name 2.csv", and "distribution destination company name.csv" are all examples of the applying information file included in the applying information file group 1031. FIG. 8 shows the selection screen sc in which at least one applying information file can be selected from these three applying information files.

On the selection screen sb shown in FIG. 7, when a selection is made to give the same applying image to all pages, for example, the screen transitions to a selection screen for the user to specify one applying image.

At the time of copying, the input image acquisition unit 1013 acquires the image data (image information) showing the image read by the image reading unit 200 from the image reading unit 200. At the time of printing, the input image acquisition unit 1013 acquires, for example, the image data (image information) transmitted from the PC of the user via the network interface 102. The input image acquisition unit 1013 stores the input image data file including the acquired image data in the auxiliary storage device 103.

The applying image generating unit 1014 converts the applying information selected by the applying information selection unit 1012 into the image data. The applying image generating unit 1014 refers to the applying information file selected by the applying information selection unit 1012, and generates applying image data showing the applying image to be applied for each copy. For example, the applying image generating unit 1014 converts the applying information, which is text format data included in the applying information file, into postscript format data. Furthermore, the applying image generating unit 1014 converts the postscript format data into raster data by a raster image processor (RIP) process used in the printing. The applying image generating unit 1014 stores the generated applying image data in the auxiliary storage device 103.

The image composition unit 1015 performs image composition when the applying information selection unit 1012 makes a selection to apply the applying image to the input image at the time of copying or printing. The image composition unit 1015 performs the image composition for compositing the input image based on the input image data and the applying image based on the applying image data, and generates the composite image data. The image composition unit 1015 generates composite image data based on the applying information file when the applying information selection unit 1012 makes a selection to apply an applying image different for each copy. As a result, composite image data different for each copy is generated. The image composition unit 1015 stores the generated composite image data in the auxiliary storage device 103.

The control unit 101 outputs the composite image data group 1034 stored in the auxiliary storage device 103 to the printer unit 130 when the applying information selection unit 1012 makes a selection to apply the applying image to the input image. As a result, the printer unit 130 forms a composite image on the sheet on which the applying image is combined with the input image based on the acquired composite image data group 1034. The control unit 101 outputs the input image data group 1032 stored in the auxiliary storage device 103 to the printer unit 130 when the applying information selection unit 1012 makes a selection to not apply the applying image to the input image. As a result, the printer unit 130 forms an input image on the sheet on which the applying image is not composited based on the acquired input image data group 1032.

Figure 9:
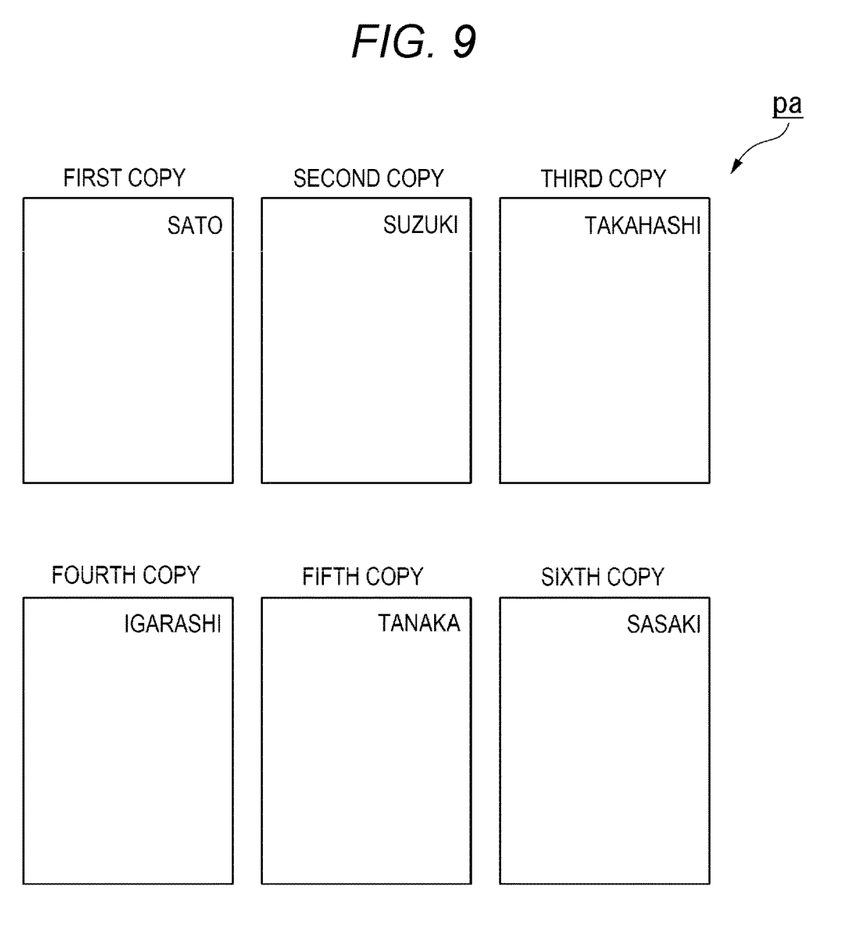
FIG. 9 is a diagram showing one example of a sheet on which an image is formed.

FIG. 9 is a diagram showing one example of a sheet on which an image is formed. Each sheet shown in FIG. 9 shows a sheet for each copy on which an image is formed when the applying information file fa shown in FIG. 5 is selected. As shown in FIG. 9, according to the applying information file fa, for example, a composite image in which an applying image showing a character string of "SATO" is composited is formed on a first sheet. According to the applying information file fa, for example, on a second sheet, a composite image in which the applying image showing a character string of "SUZUKI" is composited is formed.

The authentication unit 1016 authenticates the user who uses the image forming device 100. For example, the authentication unit 1016 performs user authentication by using the authentication information 1035 stored in advance in the auxiliary storage device 103. The authentication unit 1016 may perform the user authentication by using an external authentication server. The authentication unit 1016 may control authority or authorization such as to limit users who can execute references, new registrations, editions, deletions, and the like of the applying information file based on the result of the user authentication, for example.

Figure 10:
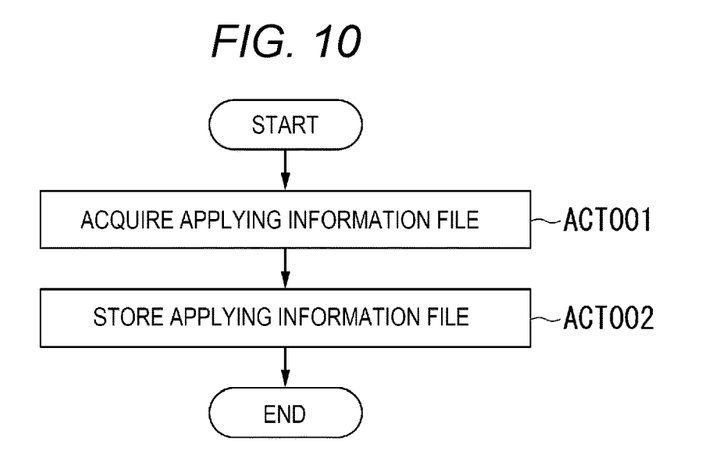
FIG. 10 is a flowchart showing one example of acts.

Hereinafter, acts at the time of new registrations of the applying information file of the image forming device 100 will be described. FIG. 10 is a flowchart showing one example of the acts at the time of new registrations of the applying information file of the image forming device 100 of the embodiment.

The applying information acquisition unit 1011 acquires the applying information file. For example, the applying information acquisition unit 1011 acquires an applying information file transmitted from the external device such as the PC of the user via the network interface 102 (ACT001). The applying information acquisition unit 1011 stores the acquired applying information file in the auxiliary storage device 103 (ACT002). With the above-described acts, the acts of the image forming device 100 shown in the flowchart of FIG. 10 are completed.

Figure 11:
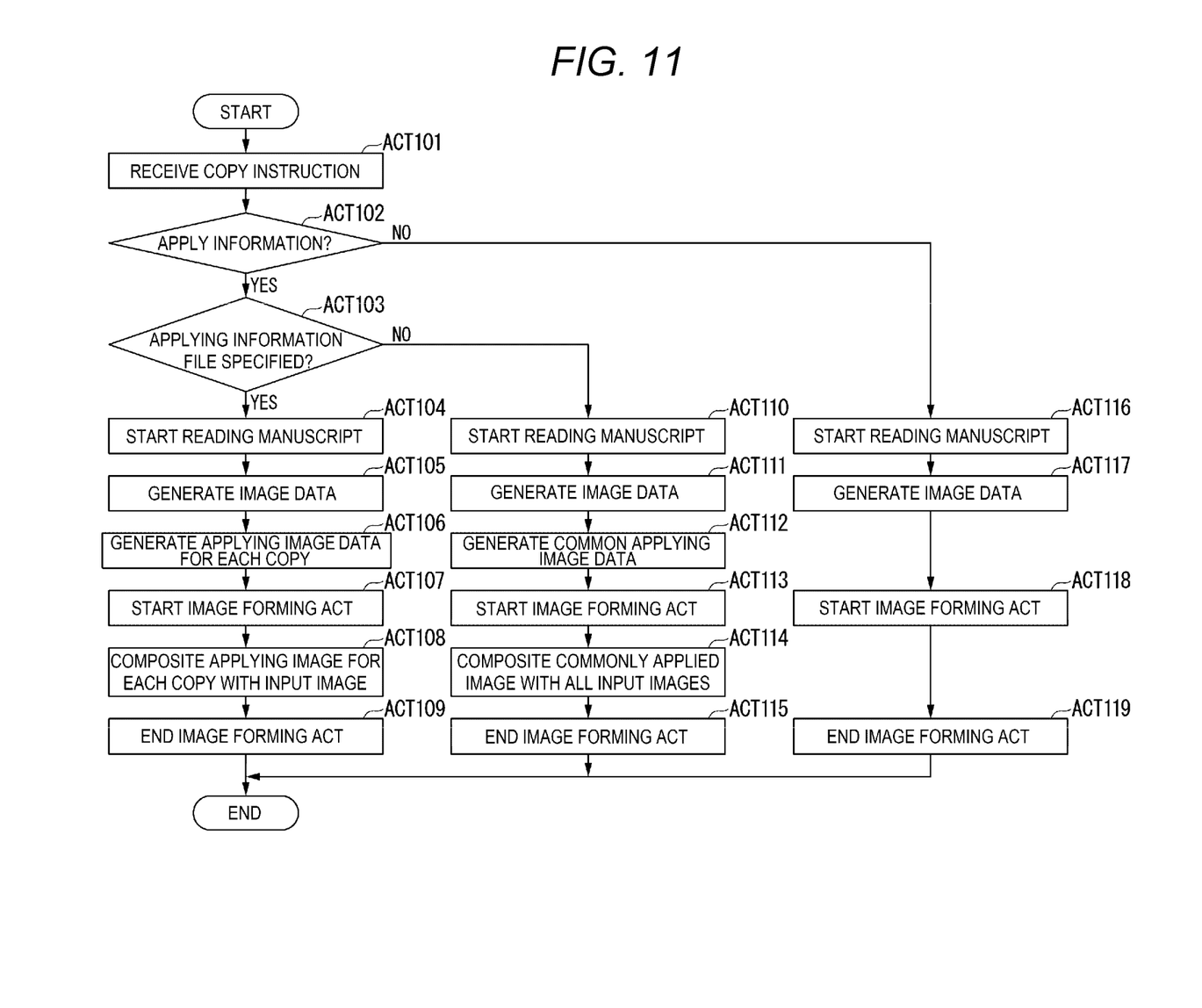
FIG. 11 is a flowchart showing one example of acts of a first embodiment.

Hereinafter, acts of the image forming device 100 at the time of copying will be described. FIG. 11 is a flowchart showing one example of the acts of the image forming device 100 of the embodiment at the time of copying. The acts of the image forming device 100 shown in this flowchart are started when a manuscript is set in the image reading unit 200 and the user inputs a copy execution instruction by the control panel 120.

When the applying information selection unit 1012 acquires information showing the copy execution instruction from the control panel 120, various selection screens are displayed on the display 110. The applying information selection unit 1012 acquires information showing the content of the input operation performed by the user from the control panel 120. The applying information selection unit 1012 determines whether to apply information to a sheet for forming an image based on the selection result of the user shown by the acquired information (ACT102).

When the applying information selection unit 1012 determines that the information is to be applied (ACT102: YES), the applying information selection unit 1012 determines whether the applying information file is specified based on the acquired information (ACT103).

When the applying information selection unit 1012 determines that the applying information file is specified (ACT103: YES), the image reading unit 200 starts reading the set manuscript (ACT104). The image reading unit 200 reads the manuscript to generate image data showing the image formed on the manuscript (ACT105). The input image acquisition unit 1013 acquires the image data from the image reading unit 200. The input image acquisition unit 1013 stores the input image data file including the acquired image data in the auxiliary storage device 103.

The applying image generating unit 1014 refers to the applying information file selected by the applying information selection unit 1012, and generates applying image data showing the applying image to be applied for each copy (ACT106). The applying image generating unit 1014 stores the generated applying image data in the auxiliary storage device 103.

The printer unit 130 starts an image forming act (ACT107). The image composition unit 1015 performs the image composition for compositing or aggregating the applying image based on the applying image data with the input image based on the input image data file, and generates the composite image data (ACT108). The image composition unit 1015 generates composite image data different for each copy based on the applying information file. The control unit 101 outputs the composite image data generated for each copy to the printer unit 130. As a result, the printer unit 130 forms the composite image, in which an applying image different for each copy is composited with the input image, on the sheet of each copy.

When the image forming act by the printer unit 130 is completed (ACT109), the acts of the image forming device 100 shown in the flowchart of FIG. 11 are completed.

Alternatively or optionally, when the applying information selection unit 1012 determines that the applying information file is not specified (ACT103: NO), the image reading unit 200 starts reading the set manuscript (ACT110). Here, the case where the applying information file is determined to be not specified is the case where the same applying image is specified to be applied to all pages. The image reading unit 200 reads the manuscript to generate the image data showing the image formed on the manuscript (ACT111). The input image acquisition unit 1013 acquires image data from the image reading unit 200. The input image acquisition unit 1013 stores the input image data file including the acquired image data in the auxiliary storage device 103.

The applying image generating unit 1014 generates applying image data showing a specific applying image to be commonly applied to all pages selected by the applying information selection unit 1012 (ACT112). The applying image generating unit 1014 stores the generated applying image data in the auxiliary storage device 103.

The printer unit 130 starts the image forming act (ACT113). The image composition unit 1015 performs the image composition for compositing the commonly applying image based on the applying image data with all the input image based on the input image data file, and generates the composite image data (ACT114). The control unit 101 outputs the generated composite image data to the printer unit 130. As a result, the printer unit 130 forms a composite image, in which the commonly applying image is composited for all the input images, on the sheet of each copy.

When the image forming act of the printer unit 130 is completed (ACT115), the acts of the image forming device 100 shown in the flowchart of FIG. 11 are completed.

Alternatively or optionally, when the applying information selection unit 1012 determines that the information is not to be applied (ACT102: NO), the image reading unit 200 starts reading the set manuscript (ACT116). The image reading unit 200 reads the manuscript to generate the image data showing the image formed on the manuscript (ACT117). The input image acquisition unit 1013 acquires image data from the image reading unit 200. The input image acquisition unit 1013 stores the input image data file including the acquired image data in the auxiliary storage device 103.

The printer unit 130 starts the image forming act (ACT118). The image composition unit 1015 forms all the input images based on the input image data file on the sheet of each copy. When the image forming act of the printer unit 130 is completed (ACT119), the acts of the image forming device 100 shown in the flowchart of FIG. 11 are completed.

FIG. 11 shows, as one example, the acts of the image forming device 100 at the time of copying. Alternatively or optionally, in the acts at the time of printing, the image forming device 100 acquires image data showing an input image from, for example, the PC of the user, instead of reading the manuscript. In this case, for example, the user may select the applying information file on his own PC using a printer driver. Other acts are the same at the time of copying and at the time of printing.

As described above, the image forming device 100 of the embodiment acquires the applying information file. The applying information file is a list in which the copies and the applying information are associated with each other. The image forming device 100 generates the composite image in which an applying image different for each copy is composited or aggregated with the input image based on the applying information file. The image forming device 100 forms the composite image that is different for each copy on the sheet.

By providing such a configuration, the image forming device 100 of the embodiment can apply information different for each copy to a sheet on which an image is to be formed. For example, when it is desired to clarify to whom the printed matter is distributed from the viewpoint of security, it is conceivable to use the applying information file in which the copy and a member name to be distributed are associated with each other. For example, the applying information file is an applying information file in which the applying information is names of persons, such as the applying information file fa shown in FIG. 5. In this case, since a member name different for each copy is applied to the printed matter, it is possible to easily associate the printed matter with the member to be distributed when the printed matter is distributed.

The applying information file may be stored in the external device that can be accessed by the image forming device 100 if necessary. The external device is, for example, a file server on the cloud or a PC of the user.

In the present embodiment, one applying information file is created for each set of applying information patterns, and the embodiment disclosed herein is not limited to this configuration. For example, a plurality of sets of applying information patterns may be combined in one file. In this case, for example, a selection screen is displayed on the display 110 such that the user can select one pattern from the plurality of sets of applying information patterns.

The applying information file fa shown in FIG. 5 contains information for associating a copy number with the applying information, and the information described in the applying information file is not limited to this configuration. For example, the applying information file may be configured such that only the applying information (the names of the persons in FIG. 5) is described by separating the applying information with commas or by inserting line breaks. In this case, for example, the applying image generating unit 1014 generates applying image data showing the applying image to be applied for each copy in order from the applying information at the beginning.

The number of copies or prints specified by the user is not the same as the number of applying information included in the applying information file, and for example, there may be cases in which the number of copies or prints is larger than the number of applying information. In this case, for example, the control unit 101 may form an input image in which the applying image is not composited for the sheets exceeding the number of the applying information. On the contrary, it is also conceivable that the number of copies of the specified copy or print by the user is less than the number of applying information included in the applying information file. In this case, for example, the applying image generating unit 1014 may generate the applying image only for the specified number of copies of the applying information.

The applying information selection unit 1012 may display on the display 110 a selection screen on which the user can select any applying information from a plurality of pieces of applying information included in one applying information file. In this case, the applying image generating unit 1014 generates the applying image only for the selected applying information. For example, when the applying information file fa shown in FIG. 5 is specified, the user selects only "SATO" and "TANAKA". In this case, the applying image generating unit 1014 converts only the text data of "SATO" and "TANAKA" into image data, respectively.

In the present embodiment, the applying information file is stored in the auxiliary storage device 103, and the applying information is converted into image data as needed at the time of copying or printing. Alternatively or optionally, the embodiment disclosed herein is not limited to this configuration. For example, when the applying information file is acquired by the applying information acquisition unit 1011, the applying image generating unit 1014 may convert the applying information into image data and store the applying image data in the auxiliary storage device 103.

In the present embodiment, although the applying information acquisition unit 1011 acquires the applying information file that is text data, the embodiment disclosed herein is not limited to this configuration. For example, the control unit 101 may acquire the applying image data. In this case, for example, the user gathers or bundles one set of the applying image data for each copy and transmits the applying image data from the PC to the image forming device 100. That is, the applying information is not limited to text data.

In the present embodiment, although the control unit 101 included in the image forming device 100 composites the input image and the applying image, the embodiment disclosed herein is not limited to this configuration. For example, the external device such as the PC of the user may perform image composition or the like.

In FIG. 9, although the applying image is formed at the upper right position of all the sheet, and the position on the sheet on which the applying image is to be formed may be any position. For example, the user may specify the position on the sheet on which the applying image is to be formed on the selection screen.

The functions of the image forming device in the above embodiments may be implemented by a computer. In this case, a program for implementing these functions may be recorded on a computer-readable recording medium, and the program recorded on the recording medium may be read and executed by a computer system. The "computer system" mentioned here includes an OS and hardware such as peripheral devices. The "computer-readable recording medium" refers to a storage device such as a portable medium such as a flexible disk, a magneto-optical disk, a ROM, and a CD-ROM, and a hard disk built in the computer system. The "computer-readable recording medium" may also include a recording medium that retains a program dynamically in a short time, such as a communication line for transmitting a program via a network such as the Internet or a communication line such as a telephone line, or a recording medium that retains a program for a predetermined time, such as a volatile memory in a computer system serving as a server or a client in this case. The program may be used to implement a part of the above functions, and combine with a program that is already recorded in the computer system to implement the above functions.

While certain embodiments have been described, the embodiments have been presented by way of examples only, and are not intended to limit the scope of the disclosure. These embodiments can be implemented in various other forms, and various omissions, substitutions, and changes can be made without departing from the gist of the disclosure. These embodiments and modifications thereof fall within the scope and spirit of the disclosure and are included in the scope of the disclosure recited in the claims and the equivalent thereof.

What is claimed is:

1. An image forming device comprising:
a controller configured to:
acquire image information, the image information including an input image to be formed on a sheet and applying information associated with each copy, in response to the input image being formed, and
generate a composite image obtained by applying an applying image based on the applying information for each copy to the input image;
an image forming processor configured to form the composite image generated for each copy on the sheet of each copy;
an authenticator configured to authenticate a user based on a user identity; and
a display configured to display a first selection screen, a second selection screen, and a third selection screen, the second selection screen configured to allow for selection of one or more types of applying information for each copy, wherein the number of some of the types are different for different copies, the third selection screen configured to allow for selection whether an applying image different for each copy is applied to the input image or the same applying image is applied to all copies, the controller is configured to generate an image in which a specific applying image is applied to the input image in response to a selection being made on the third selection screen to apply the same applying image to all copies, and the image forming processor is configured to form the input image to which the specific applying image is applied on the sheets of all copies.

2. The device according to claim 1, wherein the user identity is stored in an external server.

3. The device according to claim 1, wherein the user identity is stored locally in the device.

4. The device according to claim 1,
wherein the first selection screen is configured to allow for selection of any list from a plurality of lists of the applying information associated with each copy, wherein
the controller is configured to generate the composite image based on the list selected on the first selection screen.

5. The device according to claim 4, wherein
the second selection screen is configured to allow for selection whether to apply the applying image to the input image,
the controller is configured to not generate the composite image in response to a selection being made on the second selection screen such that the applying image is not applied to the input image, and
the image forming processor is configured to form the input image on the sheets of all copies.

6. The device according to claim 4, wherein the display is configured to control authorization of at least one of reference to the list and update of the list based on a result of the authentication by the authenticator.

7. A method for operating an image forming device, the method comprising:
acquiring image information, the image information including an input image to be formed on a sheet and applying information associated with each copy, in response to the input image being formed,
generating a composite image obtained by applying an applying image based on the applying information for each copy to the input image;
forming the composite image generated for each copy on the sheet of each copy;
authenticating a user based on a user identity;
displaying a first selection screen, a second selection screen, and a third selection screen,
selecting, via the second selection screen, one or more types of applying information for each copy, wherein the number of some of the types are different for different copies,
selecting, via the third selection screen, whether an applying image different for each copy is applied to the input image or the same applying image is applied to all copies;
generating an image in which a specific applying image is applied to the input image in response to a selection being made on the third selection screen to apply the same applying image to all copies, and
forming the input image to which the specific applying image is applied on the sheets of all copies.

8. The method according to claim 7, wherein the user identity is stored in an external server.

9. The method according to claim 7, wherein the user identity is stored locally in the device.

10. The method according to claim 7, further comprising:
displaying the first selection screen used for selecting any list from a plurality of lists of the applying information associated with each copy, and
generating the composite image based on the list selected on the first selection screen.

11. The method according to claim 10, further comprising:
displaying the second selection screen used for selecting whether to apply the applying image to the input image,
not generating the composite image in response to a selection being made on the second selection screen such that the applying image is not applied to the input image, and
forming the input image on the sheets of all copies.

12. The method according to claim 10, further comprising:
controlling authorization of at least one of reference to the list and update of the list based on a result of the authentication.

13. A non-transitory computer readable medium storing instructions which, when executed by a processor, cause the processor to carry out operations comprising:
acquiring image information, the image information including an input image to be formed on a sheet and applying information associated with each copy, in response to the input image being formed,
generating a composite image obtained by applying an applying image based on the applying information for each copy to the input image;
forming the composite image generated for each copy on the sheet of each copy;
authenticating a user based on a user identity;
displaying a first selection screen, a second selection screen, and a third selection screen,
selecting, via the second selection screen, one or more types of applying information for each copy, wherein the number of some of the types are different for different copies,
selecting, via the third selection screen, whether an applying image different for each copy is applied to the input image or the same applying image is applied to all copies;
generating an image in which a specific applying image is applied to the input image in response to a selection being made on the third selection screen to apply the same applying image to all copies, and
forming the input image to which the specific applying image is applied on the sheets of all copies.

14. The non-transitory computer readable medium according to claim 13, wherein the user identity is stored in an external server.

15. The non-transitory computer readable medium according to claim 13, wherein the operations further comprise:
displaying the first selection screen used for selecting any list from a plurality of lists of the applying information associated with each copy, and generating the composite image based on the list selected on the first selection screen.

16. The non-transitory computer readable medium according to claim 15, wherein the operations further comprise:
displaying the second selection screen used for selecting whether to apply the applying image to the input image,
not generating the composite image in response to a selection being made on the second selection screen such that the applying image is not applied to the input image, and
forming the input image on the sheets of all copies.

17. The non-transitory computer readable medium according to claim 15, wherein the operations further comprise:
controlling authorization of at least one of reference to the list and update of the list based on a result of the authentication.

* * * * *